(12) United States Patent
Asselin

(10) Patent No.: US 6,658,489 B1
(45) Date of Patent: Dec. 2, 2003

(54) METHOD FOR REPLACING A DEVICE DRIVER DURING SYSTEM OPERATION

(75) Inventor: Albert Andre Asselin, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/537,739

(22) Filed: Mar. 29, 2000

(51) Int. Cl.[7] ................................. G06F 9/00
(52) U.S. Cl. .................. 709/327; 709/321; 709/221
(58) Field of Search ................ 717/168–178; 709/221, 321, 327

(56) References Cited

U.S. PATENT DOCUMENTS

| | | | |
|---|---|---|---|
| 5,586,304 A | 12/1996 | Stupek, Jr. et al. | 395/712 |
| 5,664,195 A | 9/1997 | Chatterji | 395/712 |
| 5,715,463 A | 2/1998 | Merkin | 395/712 |
| 5,764,992 A | 6/1998 | Kullick et al. | 395/712 |
| 5,802,365 A * | 9/1998 | Kathail et al. | 709/321 |
| 5,870,610 A | 2/1999 | Beyda | 395/712 |
| 5,892,928 A | 4/1999 | Wallach et al. | 395/283 |
| 5,892,953 A | 4/1999 | Bhagria et al. | 395/712 |
| 5,910,180 A * | 6/1999 | Flory et al. | 709/321 |
| 6,006,034 A | 12/1999 | Heath et al. | 395/712 |
| 6,009,274 A | 12/1999 | Fletcher et al. | 395/712 |
| 6,023,585 A | 2/2000 | Perlman et al. | 395/712 |
| 6,167,567 A * | 12/2000 | Chiles et al. | 717/173 |
| 6,378,006 B1 * | 4/2002 | Murata | 709/321 |

OTHER PUBLICATIONS

"Jungo Driver Development Tools Version Information", Dec. 12, 1998, verion 4.0, p. 15.*
"Windriver User's Guide", 1997–2000, chapter 20, p. 271–274.*

* cited by examiner

*Primary Examiner*—John Follansbee
*Assistant Examiner*—Phuong Hoang
(74) *Attorney, Agent, or Firm*—Bracewell & Patterson LLP

(57) ABSTRACT

A method and system for replacing a device driver during system operation provides for hot-swapping device drivers without shutting down a device driver stack. Particularly useful with file system and file storage devices, the method and system utilize a shell device driver that replaces the physical device driver's entry point interface. The shell device driver has a device driver side interface that calls the physical device driver in response to operating system requests. When an update of the physical device driver is requested, either by an operating system utility or a special upgrade application, the shell device driver receives an update indication. The shell device driver can then finish required tasks, uncouple and unload the existing physical device driver and couple to the new device driver without disrupting the operating system device interface.

15 Claims, 4 Drawing Sheets

METHOD FOR REPLACING A DEVICE DRIVER DURING SYSTEM OPERATION

BACKGROUND OF THE INVENTION

1. Technical Field

The present invention relates in general to computer operating systems and device drivers, and in particular, to method for replacing a device driver without disrupting the connection of a device to an operating system.

2. Description of the Related Art

Computer systems use device drivers to provide an interface between an operating system and physical devices such as storage devices, network adapters, and display adapters. This interface is supplied to operating systems services and/or application programs. Traditionally, device drivers have been static modules that are loaded at initialization time and contain all of the program instructions required for sending commands to and exchanging data with the physical device.

More recently, dynamically loadable device driver interfaces have been implemented in operating systems such as Windows NT® and Windows 2000® that are manufactured by Microsoft® Corporation. Dynamically loadable device drivers can be loaded selectively based upon need to access the particular device supported by the driver. Dynamic device driver interfaces also allow the replacement of device drivers by shutting down the device driver, copying a new device driver in place of the old device driver and then starting the new device driver. This procedure typically requires shutting down all layers of device driver connections (or driver "stack") since in operating systems such as WINDOWS NT and WINDOWS 2000 the driver stack connections are built from the lowest level (physical layer) device driver to the highest level device driver. This presents a problem when an upgrade is desired that affects primary storage devices or devices that form part of the core processing components such as bus interface drivers or memory managers. If the device driver being replaced is a boot device driver or the storage driver for the device containing an operating system swap file, the operating system typically has to be shut down in order to replace the driver, since file device input output must be maintained on these devices for proper operation of the operating system.

Within an Internet server, computer systems that control critical systems, or other downtime intolerant computer application, there is a great need for a facility to upgrade device drivers without taking the system off-line or disrupting operations. Therefore, it is desirable to provide a method that allows for "hot-swapping" a device driver without shutting down the computer system. The hot-swapping capability is also useful in the development environment where the operating system typically must be re-booted after every device driver change when a critical file system device or core processing device driver is being developed.

SUMMARY OF THE INVENTION

The objectives of providing a method to swap a device driver controlling a device in a computer while maintaining operating systems device presence and operating systems interface operation are achieved by a method including the steps of copying the new device driver to a location within the computer, indicating to a shell device driver that an update of the device driver has been requested, disconnecting the device driver from the device in response to the update indication, connecting the new device driver to the device.

The method may be further embodied in a computer program product adapted for use with a computer system having program instructions for carrying out the steps of the method.

The objectives above are also achieved in a computer system that includes file transfer means for copying a new device driver to the computer system, and a shell device driver having an update interface. The shell device driver also includes an operating system side entry point interface, and a device driver side entry point interface for selectively coupling a selected device driver. The shell device driver uncouples the original device driver and couples to the new device driver upon receiving an update request.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
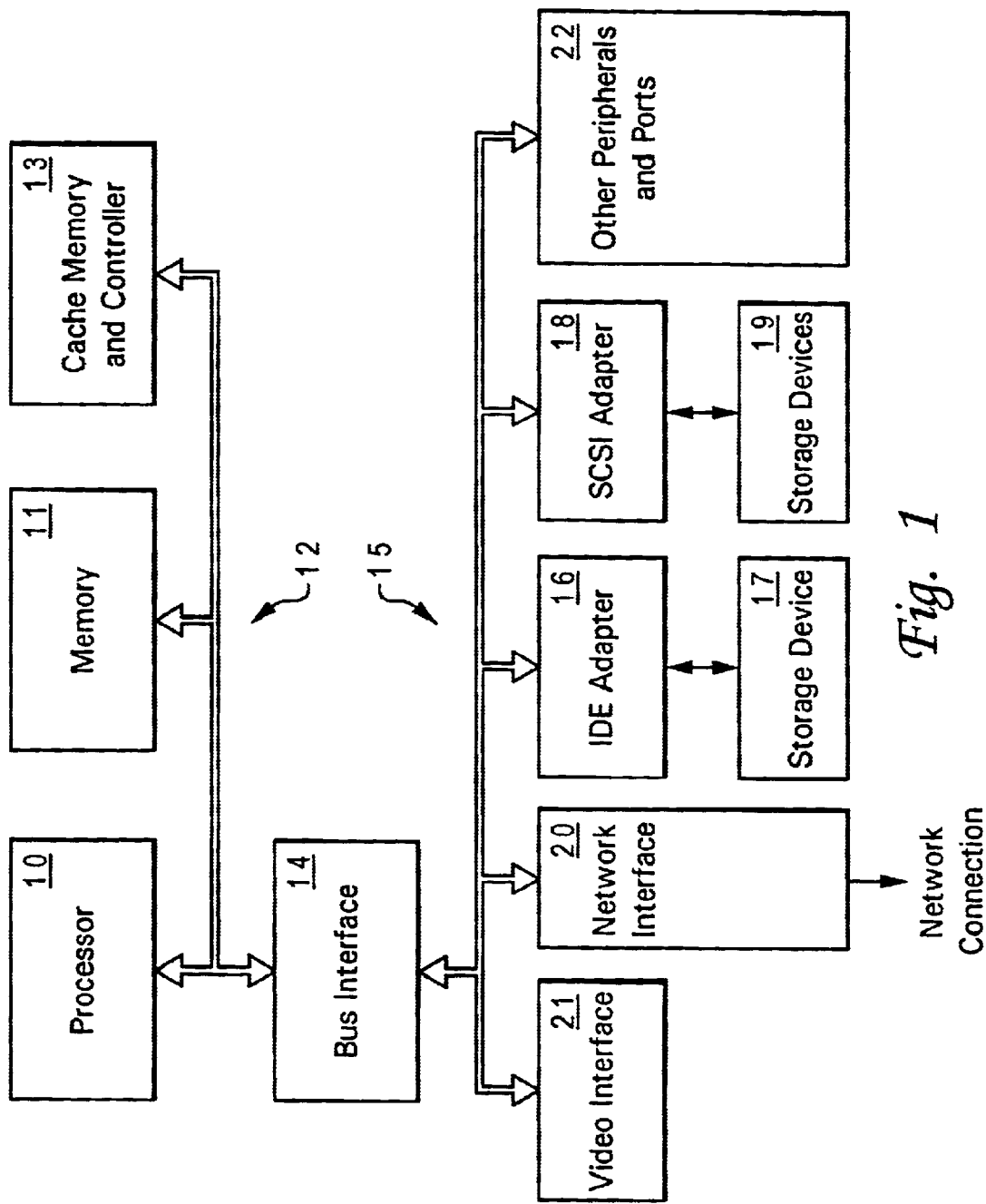
FIG. 1 is a block diagram of a computer system in which a method of the present invention may be implemented.

With reference now to the figures and in particular with reference to FIG. 1, there is depicted a block diagram of a computer system in which the present invention can be implemented. As shown, a local bus 12 couples a processor 10 for executing program instructions with a memory 11 for storing value data and program instructions. A cache memory and controller 13 are optionally supplied for storage of frequently accessed value data and program instructions. A bus interface 14 couples local bus 12 to a system bus 15. System bus 15 couples various peripheral components to bus interface 14, providing user interface and storage for the computer system. In the illustrative embodiment of FIG. 1, several peripherals are coupled to system bus 15, including a video interface 21 for interfacing a user display, a network interface 20 for connecting the computer system to a network, and an Integrated Device Eletronics (IDE) adapter 16 and a Small Computer Systems Interface (SCSI) adapter 18 for coupling storage devices 17 and 19, respectively. In addition, other peripherals and ports 22 can be coupled to the system bus 15.

Device drivers for controlling critical systems components that an operating system relies on for basic services cannot be easily replaced at run-time in the prior art. For example, cache memory and controller 13 and bus interface 14 may have their own device drivers for managing different hardware. These device drivers are typically loaded at boot time and may not be replaced except by copying over the device driver and rebooting the computer. Memory 11 may have memory manager drivers that likewise must remain installed during operation of the computer system. SCSI adapter 18 and IDE adapter 16 may control boot devices and the device on which page files are stored by the operating system's virtual memory manager. These devices must also be constantly connected to the typical operating system. Additionally, network interface 20 may need to be constantly connected in a network application such as a file server connected to the Internet. If a device driver for the network stack needs replacement, typically the server must be brought off-line to accomplish this result.

Figure 2:
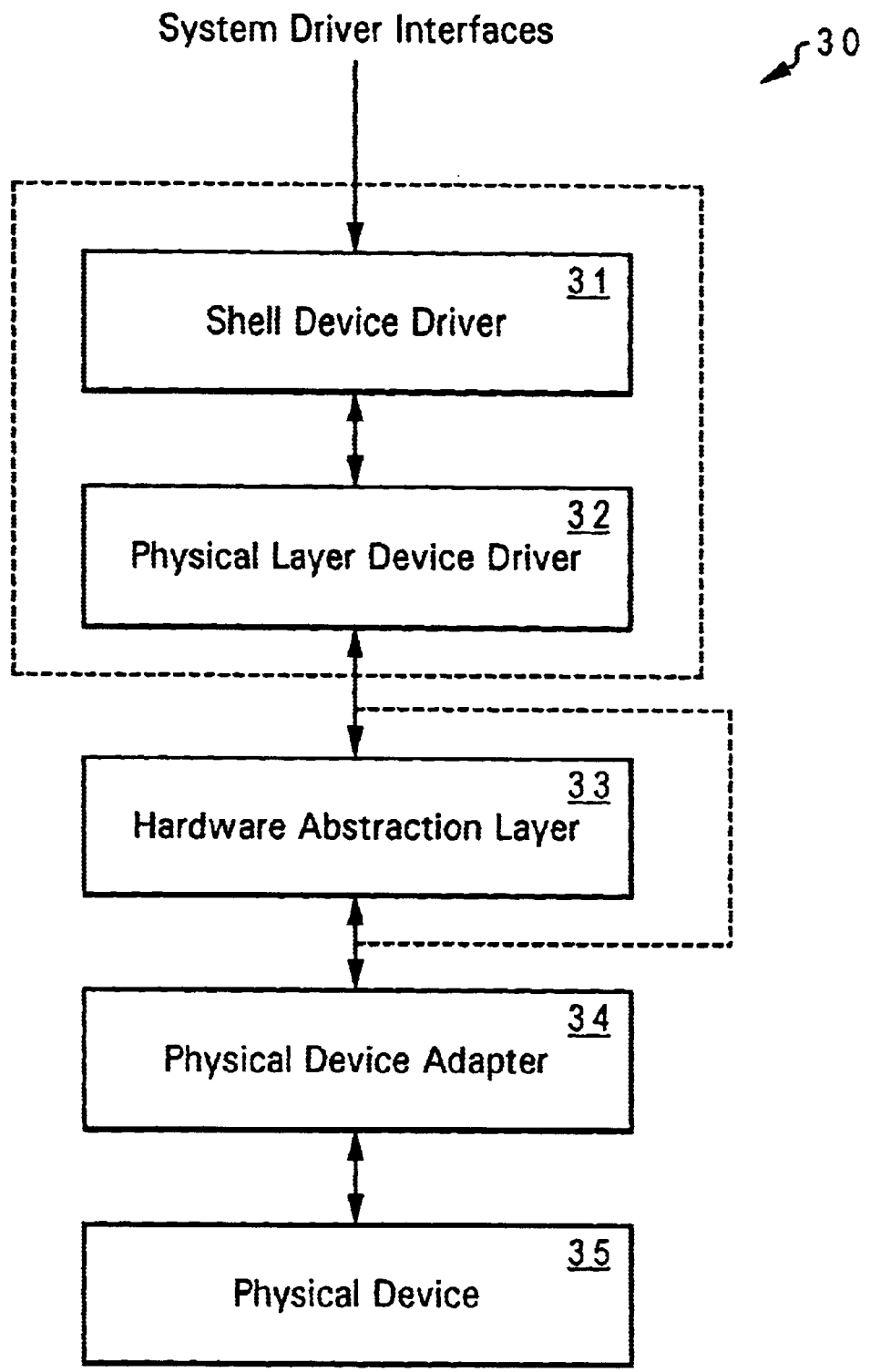
FIG. 2 is a block diagram depicting the relationship between device drivers and system components, in accordance with an embodiment of the present invention.

Referring now to FIG. 2, a device driver connection in accordance with a preferred embodiment of the invention is depicted. A physical device 35 is coupled to a physical device adapter 34, which is interfaced to the operating system by means of input/output (I/O) or memory-mapped registers or other interface means appropriate to physical device 35. The operating system may include a hardware abstraction layer 33, or there may be a direct access from a device driver 30 to the hardware. Device driver 30 utilizes hardware abstraction layer 33 to connect to the hardware resources of physical device adapter 34. According to a preferred embodiment of the present invention, device driver 30 is split into two discrete device drivers: a shell device driver 31, which provides the system driver interfaces to connect to the operating systems services, and a physical layer device driver 32 to connect to the device. By using this structure, it is possible to dynamically connect a replacement for physical layer device driver 32, without rebooting the operating system and providing only momentary delay of device access, instead of disrupting the flow of data to and from physical device 35.

Figure 3:
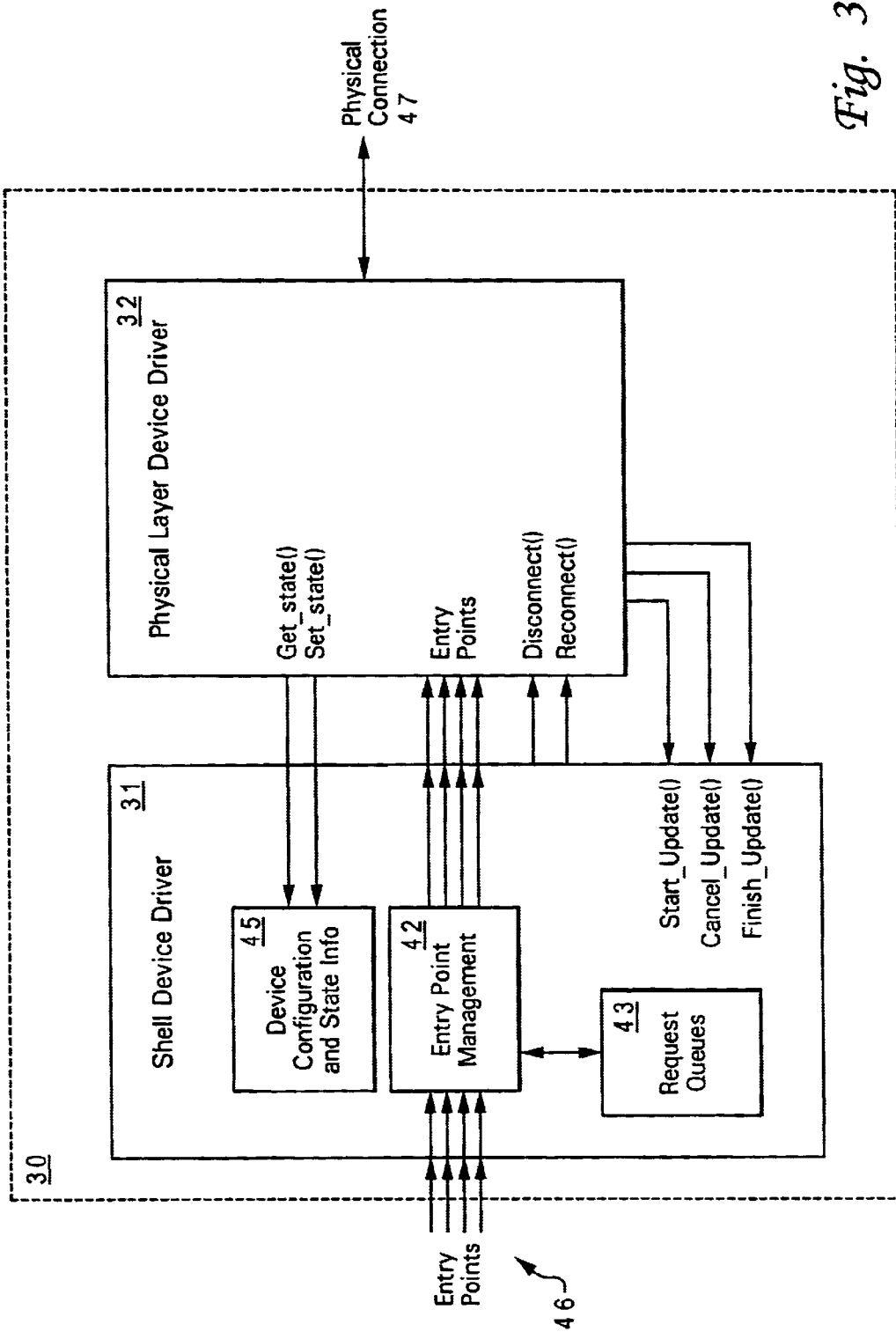
FIG. 3 is a block diagram depicting device driver modules and connections in accordance with an embodiment of the present invention.

Referring now to FIG. 3, the structure of device driver 30 is shown in detail. Entry points 46 correspond to function pointers provided by device driver 30 to the operating system, which in turn correspond to services provided by each particular device, for example, read, write and positioning services for a storage device. Shell device driver 31 provides interfaces for these entry points, shielding physical layer device driver 32 from system calls that would otherwise render it impossible to disconnect physical layer device driver 32 from the system and still maintain active connection of the device.

To manage disconnection of physical layer device driver 32, shell device driver 31 provides a special update( ) entry point, that indicates to shell device driver 31 to attempt replacement of physical layer device driver 32. Device configuration and state information 45 represents the current state of physical layer device driver and the physical connection 47 (device state). In order to maintain proper operation when physical layer device driver 32 is replaced, the state of the replacement driver must be matched to that of the previously operational physical layer device driver 32.

Shell device driver 31 provides a get_state( ) function and a set_state( ) function for this purpose. Entry point management 42 is functionality within shell device driver 31, enabling it to track when entry points have been reflected into the entry points in physical layer device driver 32, so that disconnection of physical layer device driver 32 can be managed. Reference counts or tokens that can determine the number of threads that have actively entered each entry point of physical layer device driver 32 must be kept so that the disconnection of the original driver entry points and connection of the replacement driver entry points can be achieved. An entry point table in shell device driver 31 maintains the current physical layer device driver 32 entry points as function pointers. Additionally, shell device driver 31 has request queues 43 to queue up requests received at entry points 46 while physical layer device driver 32 is being replaced. The entry point 46 calls will not be reflected to the original physical layer device driver's entry points, but will be held in abeyance for the replacement driver to handle, once initialization and state synchronization of the replacement driver is complete.

The device state within shell device driver 31 also contains pending operation information, and the update of physical layer device driver 32 can be delayed until certain operations that must be completed on the device are complete. This state information can also include information about outstanding operating system responses (callbacks) that have not occurred such as hardware interrupts or deferred procedure calls that are pending.

Figure 4:
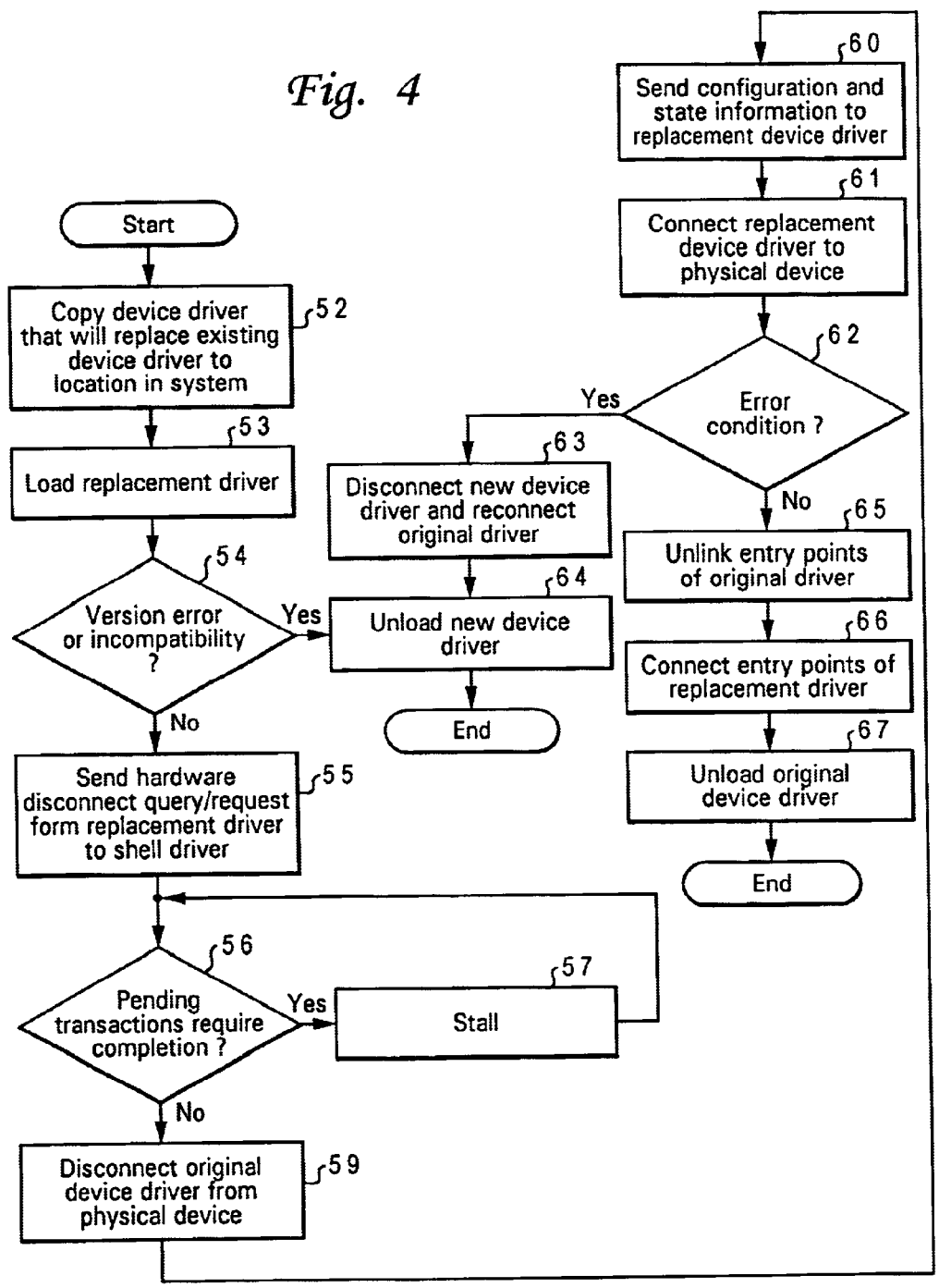
FIG. 4 is a flowchart depicting a method for replacing a device driver during system operation, in accordance with an embodiment of the present invention.

Referring now to FIG. 4, a method for replacing a device driver during system operation in accordance with a preferred embodiment of the invention is depicted in flow diagram form. An application program (update utility program) or an operating system feature initiates the update process by copying the replacement device driver to a location in the system, which may be a different file name or the same filename in a different location (step 52). The original driver location and filename could be used for the replacement driver, but it is not preferred, as if an error occurs in the update process, such as device incompatibility with the replacement driver, the original driver would be overwritten causing potential problems on the next boot.

Next, the replacement driver is loaded (step 53) and checked for version errors or incompatibility with the shell driver or device (decision 54). The version error could be flagged by incompatible data structures, incompatible feature sets, attempting to "jump" an incremental update requirement, etc. If an error or incompatibility exists, the replacement driver is unloaded (step 64). If no problem exists, then the update proceeds (step 55). A start_update( ) request is sent from the replacement driver to shell driver 31, to determine whether the original physical layer device driver 32 can be disconnected from the physical device adapter, or whether the replacement driver must wait. Shell device driver 31 checks to see if pending transactions require completion (decision 56), and if so, the shell driver can stall (step 57) until the transactions are complete. (As an alternative, the update request may return a "busy" response.)

When all transactions requiring completion are complete (decision 56), the original device driver is called to disconnect from the physical device (step 59). The replacement driver then calls the get_state( ) function in shell device driver 31 to initialize itself with the state information maintained in shell device driver 31 (step 60) and the replacement driver is connected to the physical device (step 61). If an error occurs during connection to the physical device (for example, a hardware incompatibility that shell device driver 32 was not designed to detect), the replacement device driver disconnects itself from the physical device and calls cancel_update( ) in shell device driver 31. The shell device driver 31 calls the original driver's reconnect( ) function to reconnect the original driver to the physical devices (step 63) and the replacement device driver is unloaded (step 64). If hardware initialization completes with no error (decision 62) the replacement driver calls the shell device driver's 31 finish_update( ) function with the replacement driver entry points. The shell device driver 31 then unlinks the entry points of the original driver (step 65), and the entry points of the replacement device driver are connected (step 66) and operation of the device is resumed. Finally, the original device driver is unloaded (step 67). From the time start_update( ) is called until finish_update( ) or cancel_update( ) is called, requests made at entry points to shell device driver 31 are queued on request queues 43.

There are several options available for the initial load of the replacement driver. Another novel feature of this driver architecture is that all or most of the storage for the physical layer device driver 32 can be maintained in the shell driver 31. This provides a benefit in that the memory does not have to be allocated and deallocated when physical layer device driver 32 unloads, and in the case of drivers such as the WINDOWS NT or WINDOWS 2000 SCSI minidriver, follows the design objective requiring that all memory allocation be made at system boot time. The shell driver 31 may allocate extra memory for use with an upgraded driver that might require more memory on installation, and the compatibility check in step 54 may be extended to provide a reduced feature set for the replacement driver on initial load. For example, an upgraded file system driver (FSD) that has a special compression capability requiring large calculation buffers might be loaded as an ordinary FSD during a dynamic update due to lack of buffer space, and at the next system boot will be able to obtain the memory to utilize its full feature set. The error checking of step 54 may include detection of improper hardware version with respect to the replacement driver, incompatible hardware configuration info structures (physical layer driver state), a condition where a replacement driver has already been loaded without a system reboot (replace once restriction), skipping of version numbers, an attempt to load an older driver than the current version, or lack of sufficient allocable memory.

The stalling operations of decision 56 and step 57 may take alternative forms. For some device drivers it may be advantageous to design physical layer device driver 32 so that it may take over without completing pending transactions. This complicates driver design in that the replacement driver may have to take over interrupt completion for interrupts generated due to actions performed by the original driver and handle any deferred procedure calls (callbacks) that have been queued by the original driver. In other driver designs, it is simpler to allow the original driver to complete all pending tasks and handle all pending system responses while the shell driver "spins" waiting for the original driver to finish. Alternatives between these extremes exist, for example, requiring the original driver to handle all pending interrupts and DPCs, but not to complete queued commands that have not been initiated. The replacement driver can take over the command stack, but not have to handle mid-stream responses from prior issued commands.

Although this specification refers to physical layer device drivers and physical devices such as storage devices, this should not be construed in a limiting sense. For example, a file system device (FSD), while not actually a physical device, has a device driver that typically must be continuously connected within an operating system. Therefore, the present invention would be very useful in providing dynamic upgrade capability for FSDs as well as other types of device drivers. In addition, for development of device drivers, the techniques of the present invention can improve testing and development facility in any device driver that cannot be easily unloaded and reloaded.

While the invention has been particularly shown and described with reference to a preferred embodiment, it will be understood by those skilled in the art that various changes in form and detail may be made therein without departing from the spirit and scope of the invention.

What is claimed is:

1. A method for replacing a device driver within a computer system during system operation when said device driver interfaces at least one physical device with an operating system, said method comprising:
   providing a device driver having a shell device driver and a physical layer device driver;
   loading a replacement physical layer device driver to a memory location within said computer system;
   in response to a request for an update of said device driver,
      disconnecting said device driver from a physical device;
      acquiring state information of said physical layer device driver by said shell device driver;
      sending said acquired state information to said replacement physical layer device driver by said shell device driver;
      connecting said replacement physical layer device driver to said physical device; and
      connecting said replacement physical layer device driver to said shell device driver via a set of entry points such that normal operations of said physical device is resumed.

2. The method of claim 1, wherein said method further comprises maintaining a current device state of said physical device within said shell device driver so that control of said physical device is passed from said device driver to said replacement physical layer device driver without any disruption.

3. The method of claim 1, wherein said method further comprises maintaining command and response queues in said shell device driver so that operation of said physical device is not disrupted.

4. The method of claim 1, wherein said method further comprises unlinking said physical layer device driver from said shell device driver at said set of entry points.

5. The method of claim 1, wherein said connecting said replacement physical layer device driver to said physical device further comprises
   determining whether or not said replacement physical layer device driver should be used;
   responsive to a determination that said replacement physical layer device driver should be used, linking said shell device driver to said replacement physical layer device driver via said set of entry points; and
   responsive to a determination that said replacement physical layer device driver should not be used, disconnecting said replacement physical layer device driver from said physical device and reconnecting said physical layer device driver to said physical device such that prior operation is resumed.

6. A computer program product for replacing a device driver within an computer system during system operation when said device driver interfaces at least one physical device with an operating system, said computer program product comprising:
   program code means for providing a device driver having a shell device driver and a physical layer device driver;
   program code means for loading a replacement physical layer device driver to a memory location within said computer system;
   in response to a request for an update of said device driver,
      program code means for disconnecting said device driver from a physical device;

program code means for acquiring state information of said physical layer device driver by said shell device driver;

program code means for sending said acquired state information to said replacement physical layer device driver by said shell device driver;

program code means for connecting said replacement physical layer device driver to said physical device; and program code means for connecting said replacement physical layer device driver to said shell device driver via a set of entry points such that normal operations of said physical device is resumed.

7. The computer program product of claim 6, further comprising program code means for maintaining a current device state of said physical device within said shell device driver so that control of said physical device is passed from said device driver to said replacement physical layer device driver without any disruption.

8. The computer program product of claim 6, further comprising program code means for maintaining command and response queues in said shell device driver so that operation of said physical device is not disrupted.

9. The computer program product of claim 6, further comprising program code means for unlinking said physical layer device from said shell device driver at said set of entry points.

10. The computer program product of claim 6, wherein said program code means for connecting said replacement physical layer device driver to said physical device further comprises:

program code means for determining whether or not said physical layer replacement device driver should be used;

program code means for responsive to a determination that said replacement physical layer device driver should be used, linking said shell device driver to of said replacement physical layer device driver via said set of entry points; and program code means for responsive to a determination that said replacement physical layer device driver should not be used, disconnecting said replacement physical layer device driver from said physical device and reconnecting said physical layer device driver to said physical device such that prior operation is resumed.

11. A computer system including a facility for replacing a device driver within said computer system during system operation when said device driver interfaces at least one physical device with an operating system, said computer system comprising:

a device driver having a shell device driver and a physical layer device driver;

means for loading a replacement physical layer device driver to a memory location within said computer system;

in response to a request for an update of said device driver, means for disconnecting said device driver from a physical device;

means for acquiring state information of said physical layer device driver by said shell device driver;

means for sending said acquired state information to said replacement physical layer device driver by said shell device driver;

means for connecting said replacement physical layer device driver to said physical device; and means for connecting said replacement physical layer device driver to said shell device driver via a set of entry points such that normal operations of said physical device is resumed.

12. The computer system of claim 11, wherein said shell device driver further comprises means for maintaining a current device state of said physical device so that control of said physical device can be passed from said device driver to said replacement physical layer device driver without any disruption.

13. The computer system of claim 11, wherein said shell device driver further comprises means for maintaining command and response queues so that operation of said physical device is not disrupted.

14. The computer system of claim 11, wherein said shell device driver further comprises means for unlinking said physical layer device driver at said set of entry points.

15. The computer system of claim 11, wherein said means for connecting said replacement physical layer device driver to said physical device further comprises:

means for determining whether or not said replacement physical layer device driver should be used;

responsive to a determination that said replacement physical layer device driver should be used, means for linking said shell device driver to said replacement physical layer device driver via said set of entry points; and responsive to a determination that said replacement physical layer device driver should not be used, means for disconnecting said replacement physical layer device driver from said physical device and reconnecting said physical layer device driver to said physical device such that prior operation is resumed.

* * * * *